No. 769,326. PATENTED SEPT. 6, 1904.
J. H. SHARP.
CORN STUBBLE CUTTER.
APPLICATION FILED APR. 10, 1902.
NO MODEL.
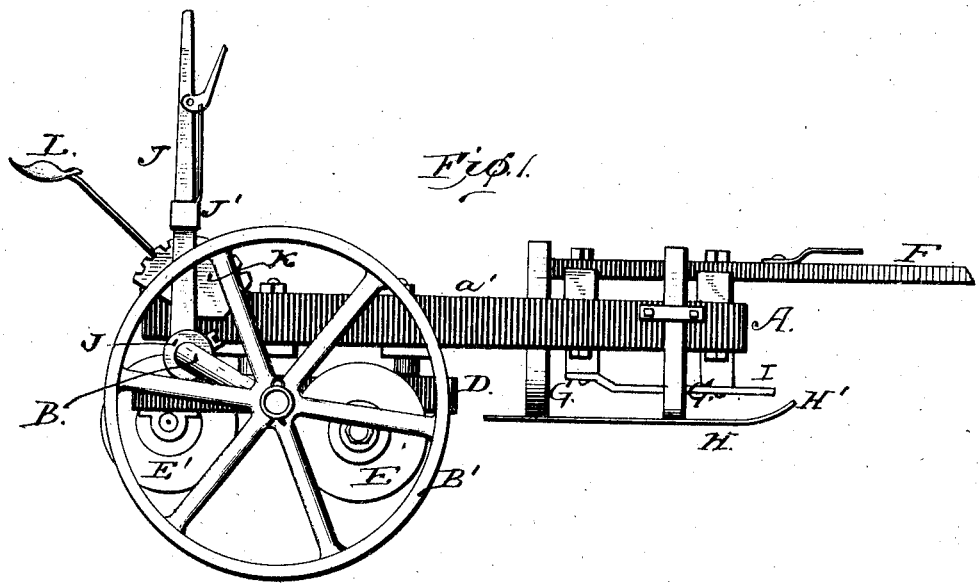
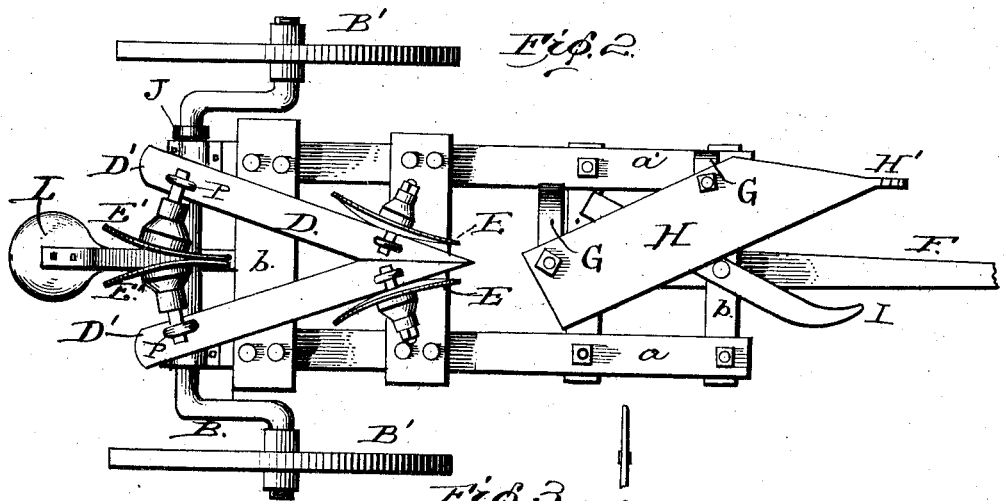
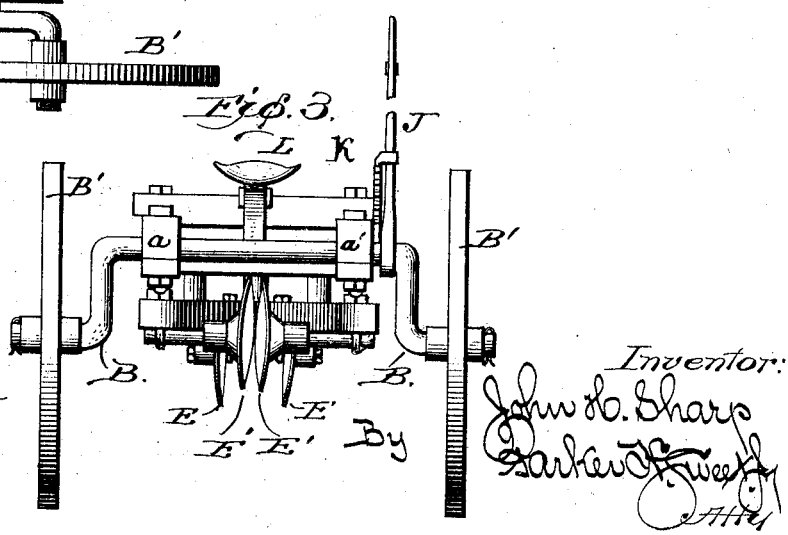
Witnesses:
J. M. Fowler Jr.
J. D. Robinson
Inventor:
John H. Sharp
By Parker & Sweet
Atty No. 769,326. Patented September 6, 1904.

UNITED STATES PATENT OFFICE.

JOHN H. SHARP, OF COLUMBUS, NEW JERSEY.

CORN-STUBBLE CUTTER.

SPECIFICATION forming part of Letters Patent No. 769,326, dated September 6, 1904.

Application filed April 10, 1902. Serial No. 102,216. (No model.)

*To all whom it may concern:*

Be it known that I, JOHN H. SHARP, a citizen of the United States, residing at Columbus, in the county of Burlington and State of New Jersey, have invented certain new and useful Improvements in Corn-Stubble Cutters; and I do hereby declare the following to be a full, clear, and exact description of the invention, such as will enable others skilled in the art to which it appertains to make and use the same.

My present invention relates to that class of machines known as "corn-stubble cutters" and is designed as an improvement upon a former patent granted to me under date of March 20, 1900, and numbered 645,693, the object of my present improvements being to provide a machine of the character noted having a variety of different adjustments whereby the work required thereof may be properly accomplished.

A further object of my invention is to provide an improved machine which is adapted for elevating and lowering the implements attached thereto, whereby the latter are brought into contact with the soil or elevated therefrom.

With these and other objects in view, which will readily appear as the nature of the invention is better understood the same consists of the novel details of construction and general arrangement of parts as will be hereinafter fully described, illustrated, and claimed.

My invention will be more fully understood by reference to the accompanying drawings, wherein the same parts are indicated by like letters throughout the several views, and in which—

Figure 1 represents a side elevation of my improved machine; Fig. 2, a bottom plan view of the same, and Fig. 3 a rear view thereof.

In carrying out my invention the narrow rectangular frame A is composed of the two side bars $a$ $a'$, secured at the proper distance apart by means of the cross-bars $b$ upon the front and rear ends thereof, suitable bearings being provided at the rear of said frame for the reception of the crank-axle B, as shown.

Beneath the rear part of the frame A and attached thereto by suitable bolts is provided a V-shaped frame D, having its point projecting toward the front of the machine and provided with a disk E on each side thereof. Upon the rearwardly-extending wings D' of said frame are also provided two disks E' in close contact, which operate on a line directly between the two front disks E, as fully shown in Fig. 2.

At the front of the frame A, immediately adjacent to the vehicle-pole F, are provided two downwardly-projecting standards G, having their lower ends bent at right angles to receive the front cutting blade or knife H, which is secured thereto in a nearly-flat or slightly-inclined position, as shown. The cutting edge of the said knife or blade is set diagonally across the front of the machine and is preferably provided at its point with an upwardly-curved projection or guard H' to deflect or clear the grass or weeds from the stubble that is to be cut. Upon the side of the frame opposite to that of cutting blade or knife is provided a guard-plate I, the edge of which is set in a reverse direction to that of the edge of said knife or blade H and the object of which is to clear away the tops of the stubble as it is cut, as also to hold the same in position during the operation of cutting, such construction being substantially the same as that shown in the patent previously granted me, as above noted.

The crank-axle B is provided with suitable machine-wheels B', and to one side of the crank-axle and rigidly secured thereto is provided an upwardly-projecting lever J, having a sliding clutch J' connected therewith, the lower end of which is adapted to engage with one of a series of notches in the segmental arm K, attached to one side of the frame A in such manner that the said frame may be held in the desired position to cause the disks to operate with the requisite force to cut and disintegrate the stubble and to properly prepare the soil for the planting of crops and also to enable the frame to be held in an elevated position to keep the disks from contact with the soil when the machine is to be wheeled to and from the field.

A seat L is attached to the rear upper part of the frame A for the reception of the driver or operator, whose weight upon the same serves to assist in holding the disks and blades down to their work when the machine is lowered in position for operation.

By means of my invention as herein set forth I am enabled to provide a machine of the character designated which will be simple, compact, and durable in construction and which will perform the required work in a rapid and satisfactory manner.

Having thus described my invention, what I claim as new and useful, and desire to secure by Letters Patent, is—

A machine of the character described, composed of the narrow rectangular frame A, provided with the front cutting-knife and guard, the V-shaped frame D provided with the disks E upon the front thereof and with intermediate rear disks E' in line with the center of said front disks, and the segmental arm K, in combination with the crank-axle B, wheels B' and operating-lever J, substantially as specified.

In testimony whereof I affix my signature in presence of two witnesses.

JOHN H. SHARP.

Witnesses:
　AMOS K. DUBELL,
　DICLESION MUDOCK.